US008690657B2

(12) United States Patent
D'Angelo

(10) Patent No.: US 8,690,657 B2
(45) Date of Patent: Apr. 8, 2014

(54) SKILL BASED LOTTERY SYSTEM

(75) Inventor: Kenneth D'Angelo, Edison, NJ (US)

(73) Assignee: Razor Sports, Inc., Edison, NJ (US)

( * ) Notice: Subject to any disclaimer, the term of this patent is extended or adjusted under 35 U.S.C. 154(b) by 1381 days.

(21) Appl. No.: 11/742,921

(22) Filed: May 1, 2007

(65) Prior Publication Data

US 2007/0202939 A1 Aug. 30, 2007

Related U.S. Application Data

(63) Continuation of application No. 10/392,138, filed on Mar. 19, 2003, now abandoned.

(60) Provisional application No. 60/402,814, filed on Aug. 12, 2002, provisional application No. 60/443,360, filed on Jan. 29, 2003.

(51) Int. Cl.
*A63F 13/00* (2014.01)

(52) U.S. Cl.
USPC ........ 463/17; 463/6; 463/16; 463/18; 463/19; 463/20; 463/21; 463/22

(58) Field of Classification Search
USPC ............................................. 463/1, 16–22, 6
See application file for complete search history.

(56) References Cited

U.S. PATENT DOCUMENTS 5,564,977 A * 10/1996 Algie .............................. 463/25
5,573,244 A * 11/1996 Mindes ........................... 463/26
5,842,921 A * 12/1998 Mindes et al. .................. 463/16
6,004,211 A * 12/1999 Brenner et al. ................. 463/40
6,024,641 A * 2/2000 Sarno ............................. 463/17
6,092,806 A * 7/2000 Follis ......................... 273/138.1
6,102,797 A * 8/2000 Kail ................................ 463/16
6,126,543 A * 10/2000 Friedman ........................ 463/16
6,347,086 B1 * 2/2002 Strachan ....................... 370/389
6,656,042 B2 * 12/2003 Reiss et al. ..................... 463/17
6,674,448 B1 * 1/2004 Garahi et al. ................. 715/719
6,688,978 B1 * 2/2004 Herman .......................... 463/25
6,910,965 B2 * 6/2005 Downes .......................... 463/28
7,094,151 B2 * 8/2006 Downes .......................... 463/28
7,201,658 B2 * 4/2007 Marshall et al. ................ 463/25
7,379,886 B1 * 5/2008 Zaring et al. ...................... 705/5
7,458,891 B2 * 12/2008 Asher et al. ..................... 463/25
7,485,037 B2 * 2/2009 Penrice ........................... 463/17
7,674,170 B2 * 3/2010 Odom et al. .................... 463/17
7,708,636 B2 * 5/2010 Asher et al. ..................... 463/22
7,789,754 B2 * 9/2010 Asher et al. ..................... 463/22
7,887,406 B2 * 2/2011 Odom et al. .................... 463/17
8,062,111 B2 * 11/2011 Aronson et al. .................. 463/6
8,353,763 B2 * 1/2013 Amaitis et al. .................. 463/28
8,419,544 B2 * 4/2013 McNutt et al. .................. 463/42
2001/0004606 A1 * 6/2001 Tracy et al. ..................... 463/16
2001/0039209 A1 * 11/2001 DeWeese et al. ............... 463/40
2002/0068633 A1 * 6/2002 Schlaifer ......................... 463/43
2002/0115488 A1 * 8/2002 Berry et al. ..................... 463/42
2002/0151340 A1 * 10/2002 Guinn et al. .................... 463/16
2002/0151342 A1 * 10/2002 Tracy et al. ..................... 463/16
2003/0119576 A1 * 6/2003 McClintic et al. ............. 463/20

(Continued)

*Primary Examiner* — William H McCulloch, Jr.
(74) *Attorney, Agent, or Firm* — Lewis Roca Rothgerber LLP

(57) ABSTRACT

The invention disclosed provides a gaming system that is based on the outcome of actual, scheduled sporting events. The winning wagers are directed to a selected sporting event and represent event participants placing in either of the top six, five or four positions. Alternate embodiments involve an array of sporting events, and other embodiments involve different scoring schemes.

8 Claims, 13 Drawing Sheets

(56) References Cited

U.S. PATENT DOCUMENTS

| | | | | |
|---|---|---|---|---|
| 2003/0157976 | A1* | 8/2003 | Simon et al. | 463/1 |
| 2003/0199315 | A1* | 10/2003 | Downes | 463/28 |
| 2004/0029627 | A1* | 2/2004 | Hannan et al. | 463/1 |
| 2004/0048656 | A1* | 3/2004 | Krynicky | 463/25 |
| 2004/0063484 | A1* | 4/2004 | Dreaper et al. | 463/16 |
| 2004/0111358 | A1* | 6/2004 | Lange et al. | 705/37 |
| 2005/0075164 | A1* | 4/2005 | Krynicky | 463/25 |
| 2007/0202939 | A1* | 8/2007 | Hannan et al. | 463/16 |
| 2010/0069137 | A1* | 3/2010 | D'Angelo | 463/17 |
| 2013/0184068 | A1* | 7/2013 | D'Angelo | 463/27 |

* cited by examiner

FIG. 4

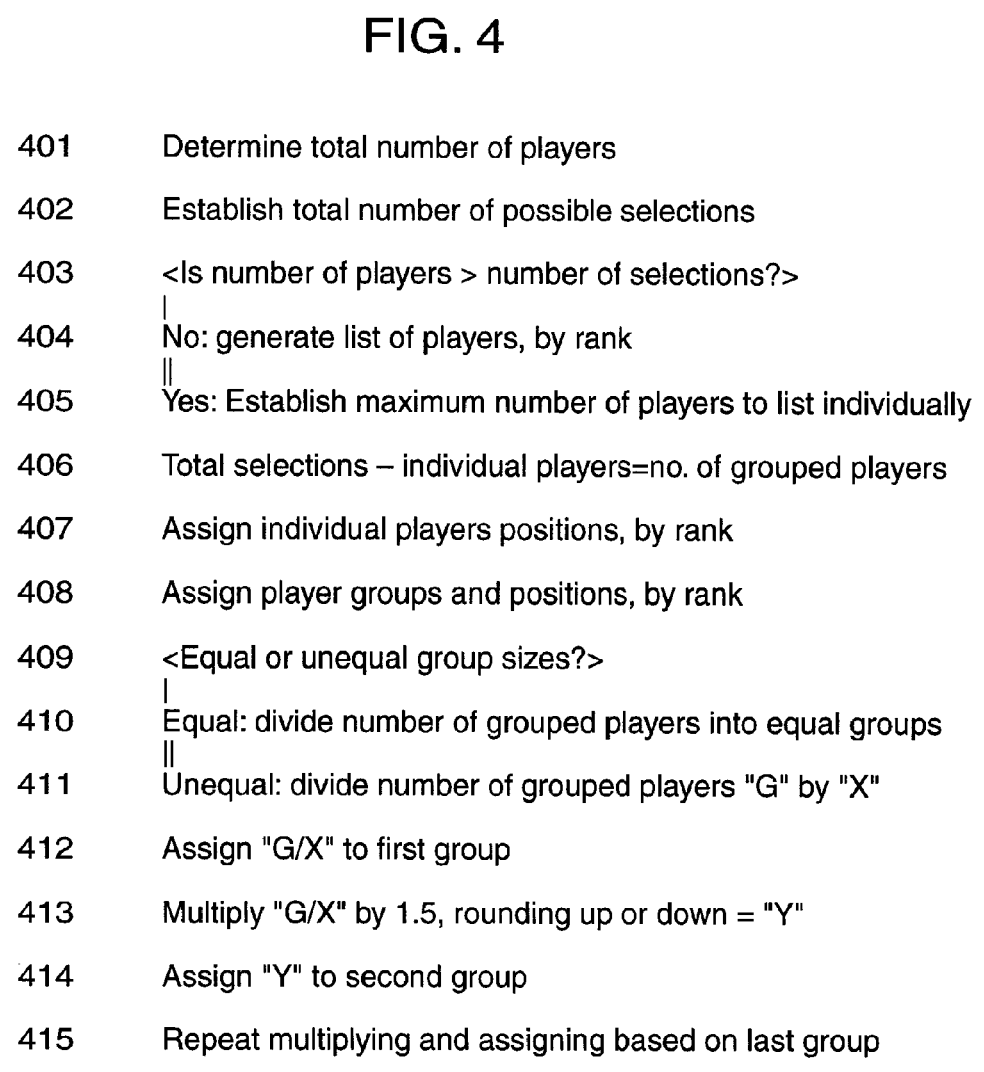

401 Determine total number of players

402 Establish total number of possible selections

403 <Is number of players > number of selections?>

|

404 No: generate list of players, by rank

||

405 Yes: Establish maximum number of players to list individually

406 Total selections – individual players=no. of grouped players

407 Assign individual players positions, by rank

408 Assign player groups and positions, by rank

409 <Equal or unequal group sizes?>

|

410 Equal: divide number of grouped players into equal groups

||

411 Unequal: divide number of grouped players "G" by "X"

412 Assign "G/X" to first group

413 Multiply "G/X" by 1.5, rounding up or down = "Y"

414 Assign "Y" to second group

415 Repeat multiplying and assigning based on last group

SKILL BASED LOTTERY SYSTEM

RELATED APPLICATION

This application is a continuation of U.S. patent application Ser. No. 10/392,138, filed Mar. 19, 2003, the entirety of which is incorporated herein by reference, which claims the benefit of and is a conversion of provisional application Nos. 60/402,814, filed Aug. 12, 2002 and 60/443,360, filed Jan. 29, 2003.

TECHNICAL FIELD

The instant invention is for a skill based lottery system wherein winning, rather than depending on a random selection, is determined by the outcome of a pre-selected sporting event or events.

BACKGROUND OF THE INVENTION

Typical lottery games require participants to correctly pick numbers (3, 4, 5 or 6 numbers), which may win if the selected numbers are drawn from a larger pool of numbers. Typically, numbers are chosen from a computer coded card which is then presented to an authorized lottery agent. Lottery tickets containing the selected set or sets of numbers are then generated by a ticket generator. Players also may opt to "quick pick," i.e., have their selections made for them by a random number generator contained in the lottery ticket machine.

The drawing to determine the winning numbers is conducted by means of a random number generating device such as, but not limited to, those disclosed in U.S. Pat. Nos. 4,583,736, 4,796,890 and 4,813,676.

A particular problem which has faced numerous jurisdictions which sponsor lottery games is that of declining revenues and profits. There are a number of state lottery agencies which are running deficits due to increased competition for players. With the proliferation of lotteries, states and Canadian provinces have aggressively campaigned to receive a larger share of static lottery revenues.

In addition, it is common for lottery jackpots to accumulate over many weeks. Accordingly, players frequently wait until a jackpot has grown to a substantial level before beginning to purchase tickets. Thus, the size of the jackpot is directly proportional to the demand for tickets. This phenomenon tends to create an inconsistent cash-flow for the lottery authority and frequently leads to frenzied buying at the last minute as the jackpot accumulates. This situation can result in people waiting in line for hours to purchase tickets, which disrupts the business of the ticket vendor and discourages the elderly and infirm from purchasing tickets.

It would be desirable to provide a novel lottery game which would increase player interest and which would help to increase the revenues of a lottery which adopted and sponsored the game.

There is also a need for a skill-based lottery to increase interest in lottery type gaming by permitting players to have an increased chance of success.

It is a further object of the present invention to provide a novel lottery game in which the winning combination is not the result of a random number generator, but is instead based on the outcome of sporting events.

These and other objects of the present invention will become apparent from the Summary and Detailed Description which follow.

SUMMARY OF THE INVENTION

In accordance with the present invention, a method for providing a lottery type game is disclosed comprising substantially the steps of establishing winning criteria from the outcome of an actual scheduled sporting event or series of events, such as, but not limited to, a golf tournament, auto race, football game, baseball game, basketball game, tennis tournament, soccer game, cricket match, bass fishing tournament, etc., the criteria being selected from the group consisting of placement in terms of finish, scoring totals, timing of scoring, statistical totals or the like; providing information for the lottery users relating to the winning criteria; accepting selections and a wager from the users; awaiting the outcome of the events to determine winning values; matching the selections of users to the outcome of the events to determine whether a user has won; and providing a payment to winners. In this way, the criteria that form the basis for winning are objective and verifiable elements. Therefore, users of the lottery are assured that the winning combination is not "fixed" and that their own analysis of the sporting participant players or teams is partly responsible for winning the lottery. Thus, the lottery system of the present invention is not just luck.

In a preferred embodiment prior to the users participating in the lottery, the provider selects elements that will result in a winning combination. For example, in a most preferred embodiment the provider selects a golf tournament such as the Masters in which about 140 golfers typically participate. Each golfer is assigned a number by the lottery provider, the number being based on established rankings such as are available on published websites such as the PGA web site. Users then select those players on which to bet will finish in the top six places in the tournament.

In another preferred embodiment the provider can provide a lottery in which only the top four or five finishers need to be correctly chosen. The provider may make several lotteries available simultaneously. According to different embodiments, winning may be the result of selecting all four or five or six players in the finishing sequence or simply selecting the group correctly, without regard to individual placement.

In other preferred embodiments the sporting event upon which the lottery is based is car racing such as but not limited to NASCAR which typically has a field of 43 drivers. Numbers are assigned to the drivers by their starting or "pole" position available from published sources such as newspapers or web sites. Users then select the top four, five or six finishers depending on the lottery game established by the provider.

In a most preferred embodiment, the provider may further divide the sporting event participants into "fields." For example, for a golf tournament with a large number of players the fields may be divided as follows:

| FIELD NO. | PARTICIPANT NO. |
|---|---|
| 1 | 1 |
| 2 | 2 |
| 3 | 3 |
| 4 | 4 |
| 5 | 5 |
| 6 | 6 |
| 7 | 7 |
| 8 | 8 |
| * | * |
| * | * |
| * | * |
| 40 | 40 |
| 41 | 41-50 |
| 42 | 51-60 |
| 43 | 61-70 |
| 44 | 71-80 |
| 45 | 81-90 |
| 46 | 91-100 |

-continued

| FIELD NO. | PARTICIPANT NO. |
|---|---|
| 47 | 101-110 |
| 48 | 111-120 |
| 49 | 121-130 |
| 50 | 131-140 |

Therefore users can select a field numbered 41 or higher and obtain ten chances (golfers) instead of only one, thereby increasing the users chance of winning. A further embodiment, intended to increase interest in wagering on groups of lower ranked players is to increase the number of players in a group as the ranking goes lower.

In this case, the fields would be divided as follows:

| FIELD NO. | PARTICIPANT NO. |
|---|---|
| 1 | 1 |
| 2 | 2 |
| 3 | 3 |
| * | * |
| * | * |
| * | * |
| 40 | 40 |
| 41 | 41-44 |
| 42 | 45-51 |
| 43 | 52-61 |
| 44 | 62-75 |
| 45 | 76-96 |
| 46 | 97-127 |
| 47 | 128-170 |

The foregoing adjusted "field" can be divided in any number of ways. The field can be divided in a variety of sporting events in the same way, e.g., for car racing, bicycle racing such as the Tour de France, boat racing such as the Americas Cup yacht race and the like.

In yet another embodiment, the lottery can be applied to team sporting events. For example, the criteria can be set based on scoring totals of football, basketball, baseball, soccer or hockey teams over a given period of time. In one preferred embodiment the provider sets the criteria as the six highest scoring football teams during one weekend of regular season National Football League play. Users must then correctly choose the six National Football League teams that will score the most points during that weekend. The same type of criteria can be applied to any other team sport for a given time period. Other variations of criteria may be fewest points (runs, goals, etc.) allowed by a team, fewest points (runs, golds, etc.) scored, etc. Other combinations of betting criteria are, for example, the six highest (or lowest) scoring teams in a time period, the first (or last) teams to score, teams shooting the most (least) shots on goal, and other possible permutations.

Other variations include season-long criteria for team sports such as, but not limited to, wins, losses, total points (runs, goals, etc.) scored, total points (runs, goals, etc.) allowed, etc. In every instance, regardless of the criteria, users of the lottery must choose four, five or six finishers depending on the lottery structure in order to win.

Another advantage of the invention is that the winning combination is not entirely random. Factors such as how participants in the sporting event compete in certain venues, injury reports, weather conditions, current level of play and the like all influence the outcome. Therefore, the skill of a user as a "handicapper" in large part can increase the chances of that user winning.

In a most preferred embodiment, the lottery is available to a global market, increasing the number of system users and the potential for returns.

In additional preferred embodiments, a user accesses the game via a wide area network or by some other remote means. The user is requested to input information regarding identification of the user and payment means. Once the user has decided to actually place a wager on a game or a grouping of games and has provided the requested information, the user accesses a gaming page which presents choices and accepts the user's selection for the given game or games. Once the user has input his or her selection, the user is asked to confirm the user's number and/or character selection. The user is then sent a confirmation of the user's number and/or character and, in some preferred embodiments, a ticket or an entry identification number, preferably by email. The user then waits for the conclusion of the event for the winning combination to be established.

BRIEF DESCRIPTION OF THE DRAWINGS

FIG. 4 is a flowchart showing the process involved in one preferred embodiment of the present invention for establishing a field of players, some of which are listed individually and some of which are listed in groups.

DETAILED DESCRIPTION OF PREFERRED EMBODIMENTS

Preferred embodiments of the instant invention operate on a network, such as, for example, the Internet, or another type of remote access system, such as a kiosk-based terminal, a telephone, a personal digital assistant, a pulse code system, web TV, or any other device or method that communicates alpha numeric data through a server.

Figure 1:
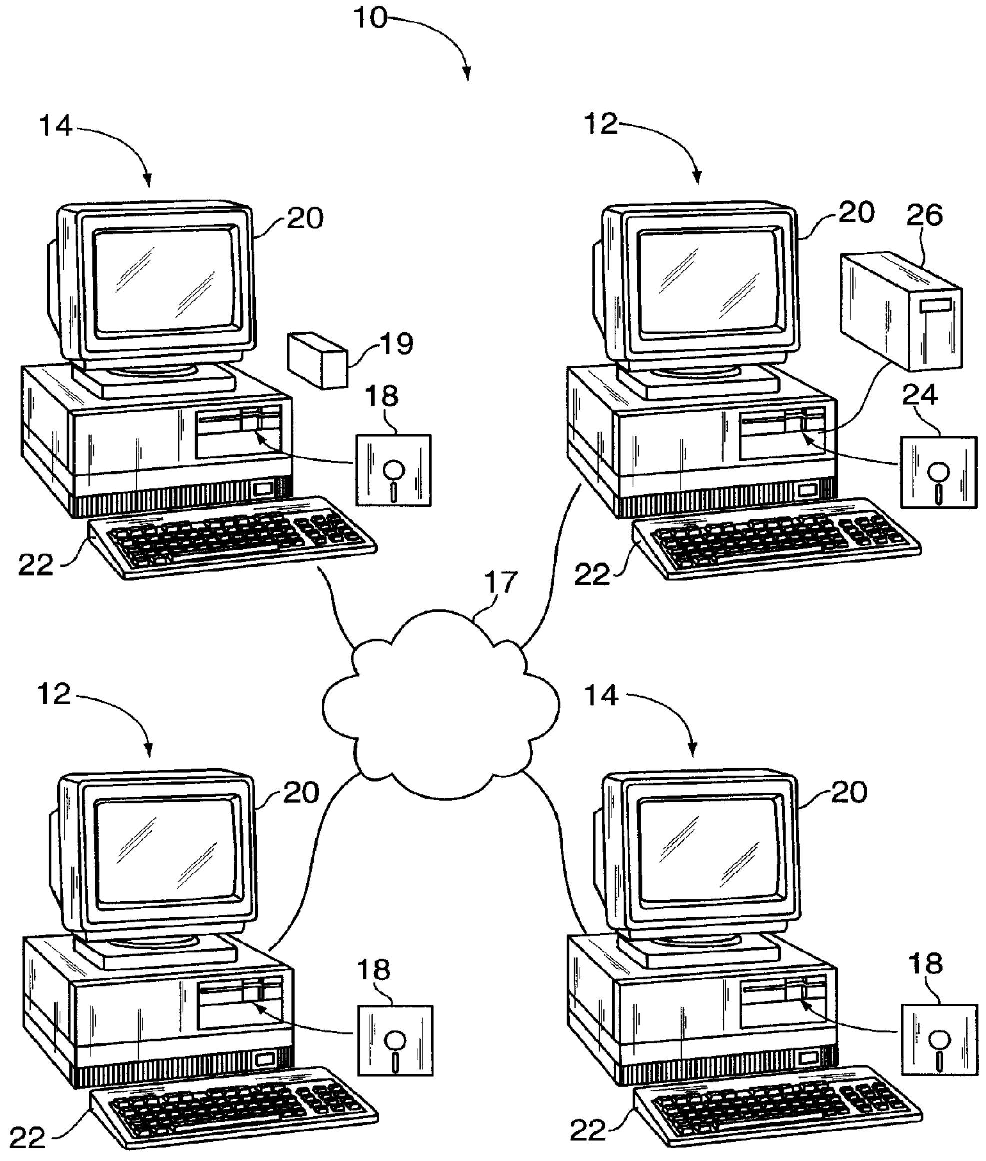
FIG. 1 is an illustration of typical hardware in a network system environment in accordance with a preferred embodiment of the present invention.

Preferred embodiments of the instant invention operate in accordance with a plurality of networked computers, such as, for example, a user computer and a server computer which are coupled together on a communications network, such as, for example, the Internet or a wide area network. FIG. 1 depicts a network communication hardware 10 that operates to implement preferred embodiments of the invention. In preferred embodiments, network communication hardware 10 includes a server computer 12 and a client, or user, computer terminal 14, wherein server computer 12 and user computer 14 are in electronic communication with each other via a network 17. Network 17 may be a local area network (LAN), a wide area network (WAN), or the Internet, and is hardwired, wireless, or a hybrid thereof.

In some preferred embodiments, network communication hardware 10 includes a plurality of either servers 12, user computers 14, or any combination thereof. Server 12 incorporates a memory device from which gaming information and other relevant data is accessible to user computer 14. Preferably, hardware 10 includes a plurality of servers 12 that are operatively connected to network 17. Two such servers 12 are shown in FIG. 1. It will be understood that network systems in accordance with various embodiments will include more than two servers 12.

Server computer 12 comprises any suitable network-connectable device capable of providing content (data representing text, hypertext, photographs, graphics, video and/or audio) for communication over network 17. In preferred embodiments, server computer 12 is a programmable processor capable of operating in accordance with programs stored on one or more of computer readable media 24 (for example, but not limited to, floppy disks, hard disks, random access memory RAM, CD-ROM, ZIP disks), to provide content for communication to a connected user computer 14. Server computer 12 comprises, for example, but is not limited to, a personal computer, a mainframe computer, network computer, portable computer, personal digital assistant (such as, a 3Com Palm Pilot), or the like. The server computer 12 may include one or more internal data storage devices, e.g. a hard drive (not shown), for storing content for communication to a user computer 14. Alternatively, or in addition, server computer 12 is coupled to an external data storage device, computer or other means, generally represented at 26, from which server computer 12 obtains information for communication to user computer 14. In one embodiment, external device 26 comprises a further network device coupled to network 17. Server computer 12 is controlled by suitable software to provide the requested content information to the requesting user computer 14, provided that various criteria are met.

In a preferred WAN environment, such as the Internet, server computer 12 is controlled by software adapted to generate a response to a valid request for content information by transmitting or downloading data in the form of one or more HTML files to a requesting user computer 14. It will be understood by those skilled in the art that this process involves communication through routers and other network components in addition to suitable servers, as is dictated by the particular network environment.

User computer 14 comprises any suitable network-adapted device capable of communicating with other devices in the network system according to an established protocol. In preferred embodiments, user computer 14 comprises a programmable processor capable of operating in accordance with programs stored on one or more computer readable media 18 (for example, but not limited to floppy disk, hard disk, computer network, random access memory (RAM), CD Rom, ZIP disks, or the like). User computer 14 also has a display device 20 for providing a user-perceivable display (for example, but not limited to visual displays, such as cathode ray tube (CRT) displays, light-emitting-diode (LED) or liquid-crystal-diode (LCD) displays, plasma displays or the like, audio displays or tactile displays), and a user input device 22 (for example, but not limited to, a keyboard, mouse, trackball, touch pad, microphone, or the like). In one preferred embodiment, user computer 14 comprises a personal computer system having a CRT display, a keyboard and a mouse user-input device.

The user computer 14 is controlled by suitable software, including network communication and browser software to allow a user to request, receive and display information (or content) from or through a provider computer 12 on the network system 10. The user computers 14 are any means capable of communicating with the server computers 12, including, but not limited, to personal computers, PDAs, email-enabled cell phones and ATM-type terminals. User computers 14 access server computers 12 via network 17 or through some other remote access, such as, for example, by telephone lines.

Preferred embodiments of the instant invention base winning criteria on one or more sporting events, the results of the sporting event or events, and further provide a verifiable method of determining the winning combination of the lottery. The present invention is typically applied to a single sporting event when the sporting event involves a large number of competing entrants, such as but not limited to a golf tournament, basketball tournament such as the NCAA tournament or a baseball season. The invention is typically applied to a plurality of sporting events when the number of entrants in a single event is small, a basketball game (between two teams), but there are many such games being played in a confined time frame, such as a weekend of professional basketball games. Indeed, individual players can independently ascertain the results of the lottery and verify the authenticity of such results through published outcomes of the particular sporting events involved.

Figure 2A:
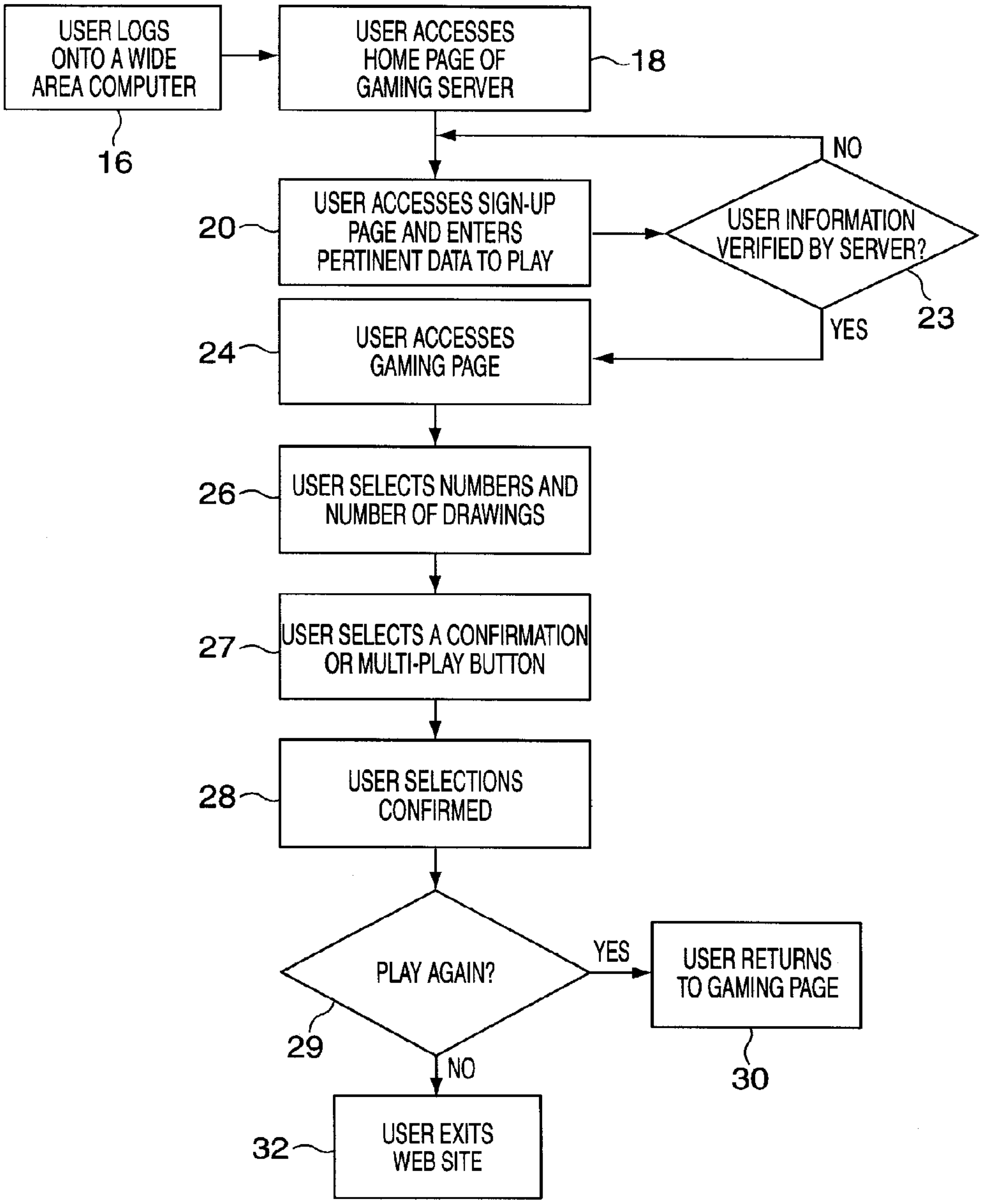
FIG. 2A depicts a flowchart diagram of a preferred embodiment of the present invention.

With reference to FIG. 2A, a flowchart of operations involved in one preferred embodiment of the invention is disclosed. According to the FIG. 2A flowchart, players who desire to participate in a particular lottery game establish a connection in step 16 on a wide area computer network between a user computer 14 (see FIG. 1) and a server 12. In preferred embodiments, a substantially unlimited number of players can connect to the system, receive information and place wagers at any given time and for any given game or series of games. Indeed, in preferred embodiments, global participation in any given game is possible. As is well known, the processing speed of modern computers, being on the order of millions of operations per second, permits such seemingly simultaneous accommodation of many users.

Once a player has established a connection with server 12 (FIG. 1), the player accesses an initial, or home, page in step 18 (FIG. 2A). To participate in a game, the user registers or sign-up through an accessible sign-up page, examples of which ware illustrated in FIGS. 3A, 3B and 3C, via a link from the home page, as will be described below. Once a user has accessed the sign-up page, the user is able to enter pertinent information according to step 20, such as, for example, name, address, date of birth, the method of payment information. Address and date of birth information may be used in combination for user confirmation. The inputted information is conveyed to and verified by server 12 in step 23, such as, for example, the credit information or account information. If the information is accepted, server 12 allows the user to access a gaming page in step 24 via an access button, such as a "play" button.

Once connected to the gaming pages, the user enters selections at step 26, and enters the number of desired drawings, that is, the number of games to play with these selections. The "selection" is data, in the form of numbers, alphabet characters, mouse clicks, or other indicia, being representative of the user's choices for the game.

When the user is satisfied with his selections, the user selects a confirmation 27, or multiplay element on the gaming page via an access button. The gaming server then accesses the confirmation page. Once the user has accessed the confirmation page, the user's selections and number of plays are displayed for the user. The display of the selections provides confirmation at step 28 to the user that the correct selections have been recorded. In one preferred embodiment, the user reconfirms the selections by selecting an "OK" feature, or has the opportunity to change the selections by selecting a "CLEAR" feature, which indicates that the choices are incorrect and allows the user to make new selections.

After the user's selections and plays have been confirmed, the user can access another play via a repeat play utility, such as a "Play Another Game" feature at step 29. If the user selects the "Play Another Game" option and chooses to play, the server will return the user to the general gaming page at step 30. If instead, the user chooses to terminate play, the user then exits the gaming web site 32.

Figure 2B:
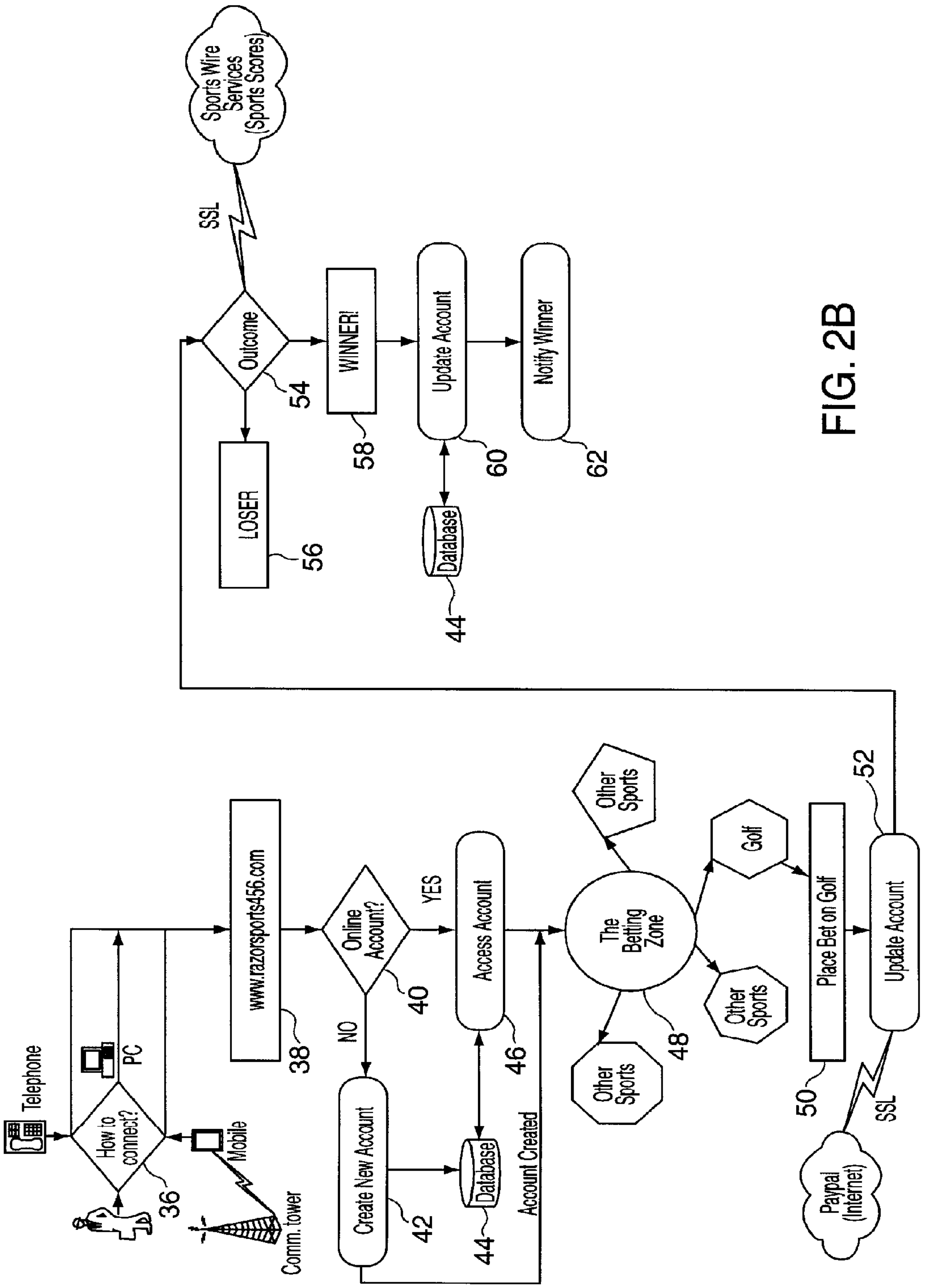
FIG. 2B depicts a flowchart diagram of a further preferred embodiment of the present invention.

A further preferred embodiment of the present invention is shown in flowchart depiction in FIG. 2B. A user of the lottery system connects at step 36 by various means, some of which are telephone, personal visit, computer link and mobile communication. Access to the system occurs through an Internet web site at step 38, from which the determination is made at step 40 of whether the user has an existing account. If the user has an existing account, the account is accessed at step 46. If not, the user is requested at step 42 to set up an account, the information for which is entered into the system database at step 44, in compliance with for example FIGS. 3A-3C, described below. After entering information into the database at step 44, the established account is accessed at step 46. The user is then presented with a selection at step 48 for various sports on which wagers may be made, for example, golf, tennis, football, hockey, soccer, track & field, bowling, etc. In a preferred embodiment, assuming that the user selects golf as a choice, the system moves to step 50 to make a selection and place a bet. The selection process is discussed below. After the user and other users of the system have placed their wagers, the time window for wagering is elapsed at the beginning of the sporting event or events, and the results are awaited.

The results, or outcome, of the sporting event is determined at step 54. The outcome may be reported directly to the server from a wire service or may be inputted manually after reference to a news reporting service or the like. Each wager ticket is evaluated by comparison to the reported outcome to determine whether it is a winner or a loser. If a winner is determined at step 58, the account of the holder of the winning ticket is updated, i.e., winning amount deposited, at step 60, and the information is entered into database 44. If the ticket is not a winner, determined at step 56, or after a deposit of the winning amount is made at step 58 and the account is updated at step 60, the holder of the winning ticket is notified at step 62, by any known means of communication.

The game administrator or provider presents the winning numbers which have been obtained from the results of an event. For example, and discussed below, in one preferred embodiment winning criteria are determined from the results of a selected sporting event such as, but not limited to a golf tournament wherein, for example, the players are ranked according to their prior performance and given ranking numbers. The top six finishers of the event are identified in a post-tournament report by numbers corresponding to their rankings. The results of the tournament are posted and the lottery winners are notified by any acceptable means, including, but not limited to, telephone, e-mail, postal service, facsimile and posting on the web site maintained by the service operator.

Figure 3A:
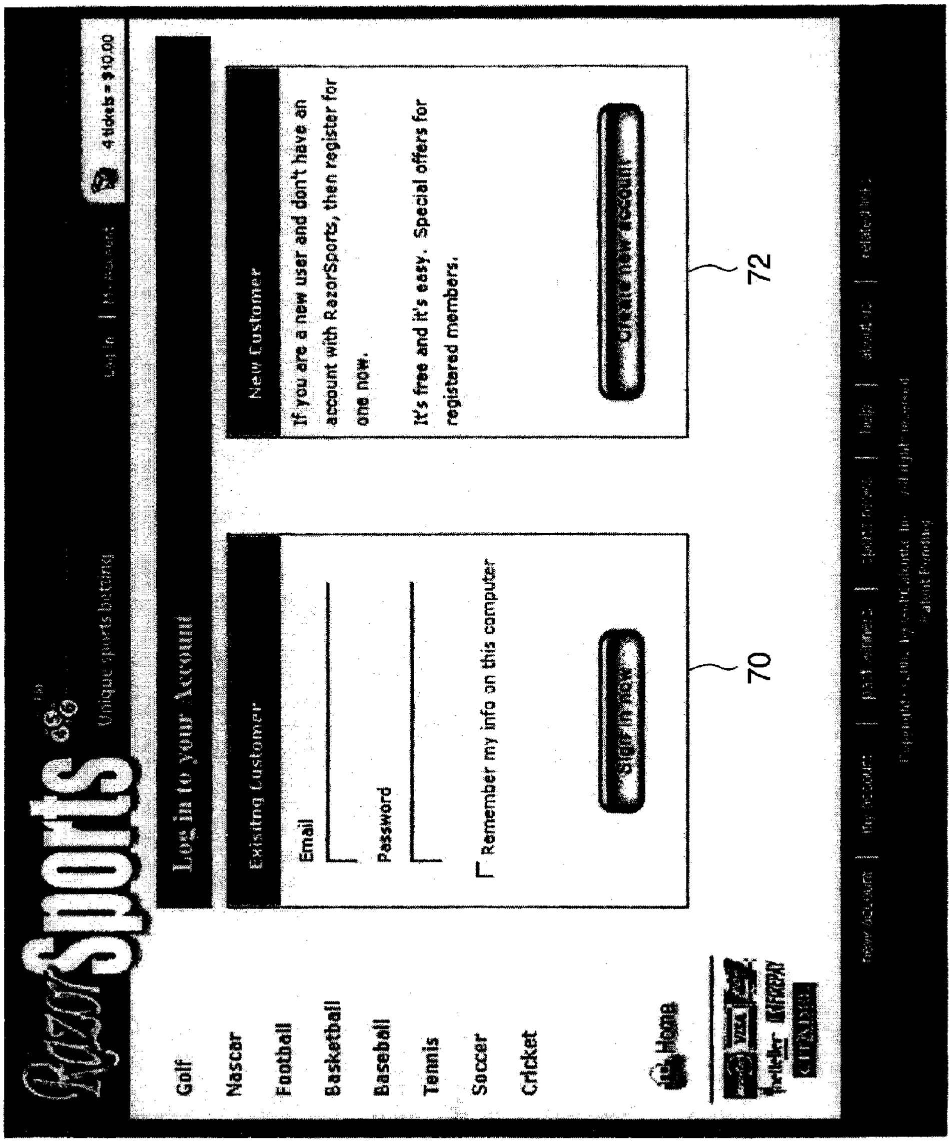
FIG. 3A depicts a log in/create account page of a preferred embodiment of the present invention.
Figure 3B:
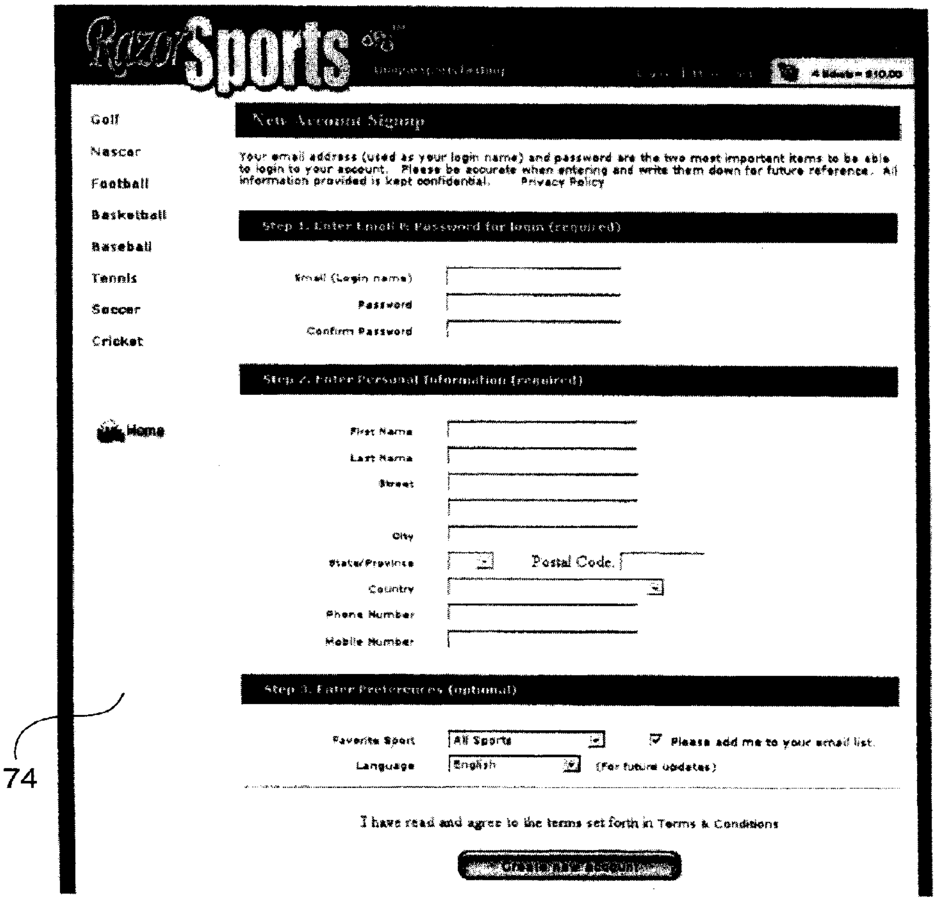
FIG. 3B depicts a financial information page of a preferred embodiment of the present invention.
Figure 3C:
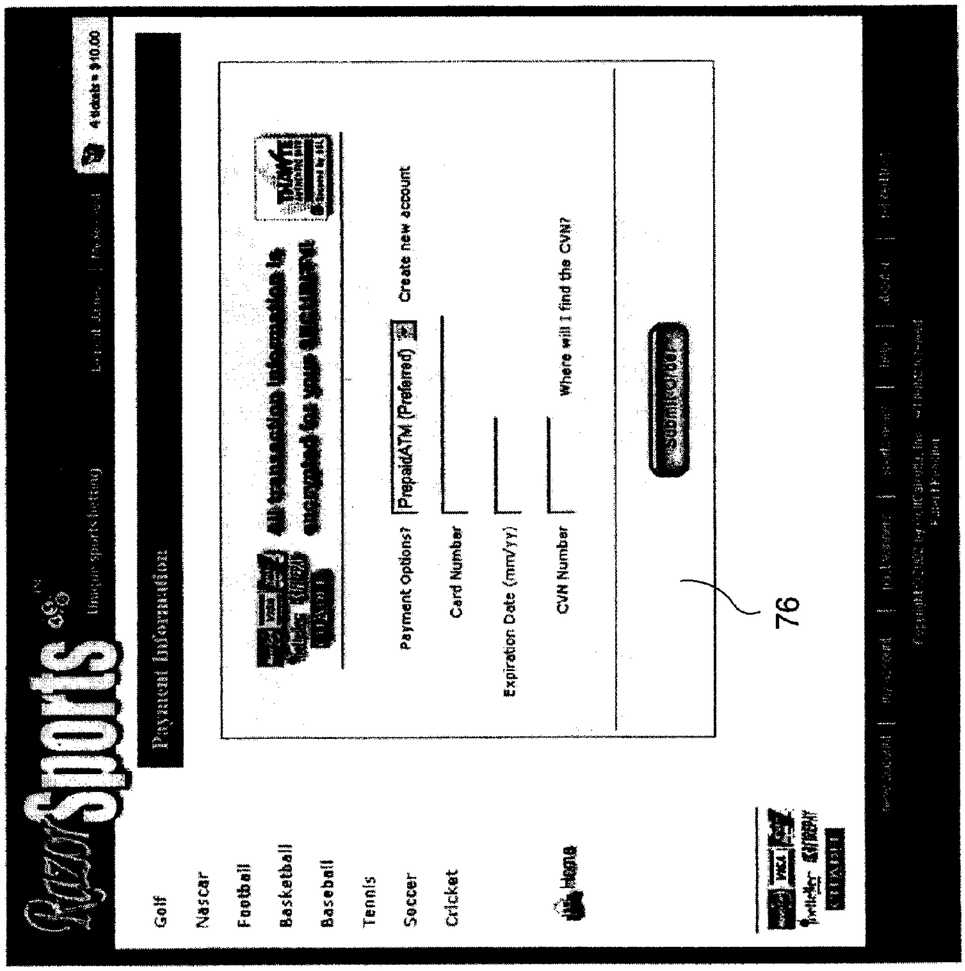
FIG. 3C depicts a payment information page of a preferred embodiment of the present invention.

Registration is preferably completed before wagering. Registration can be implemented by entry of the information either manually or through a computer terminal, such as may be presented over the Internet or in a sports book parlor or at a kiosk. Each potential user will preferably be asked to register when entering the system by being presented with a screen, an example of which is shown in FIG. 3A, by entering information in the windows of dialog box 70, e.g., email name and password. In this embodiment, a new user will be required to open an account by clicking on the "create" button in dialog box 72. The new user will move to FIG. 3B to enter identifying information into the several data windows in dialog box 74. At the completion of box 74, the user will click on the "create" button and be presented with the screen in FIG. 3C, including dialog box 76 for the submission of payment methods and information. Where available, payment information may be entered by inserting a bank card or credit card in a reader. Upon completing the registration information, the user is validated by the system and presented with sport and event selection and wagering options.

Figure 2C:
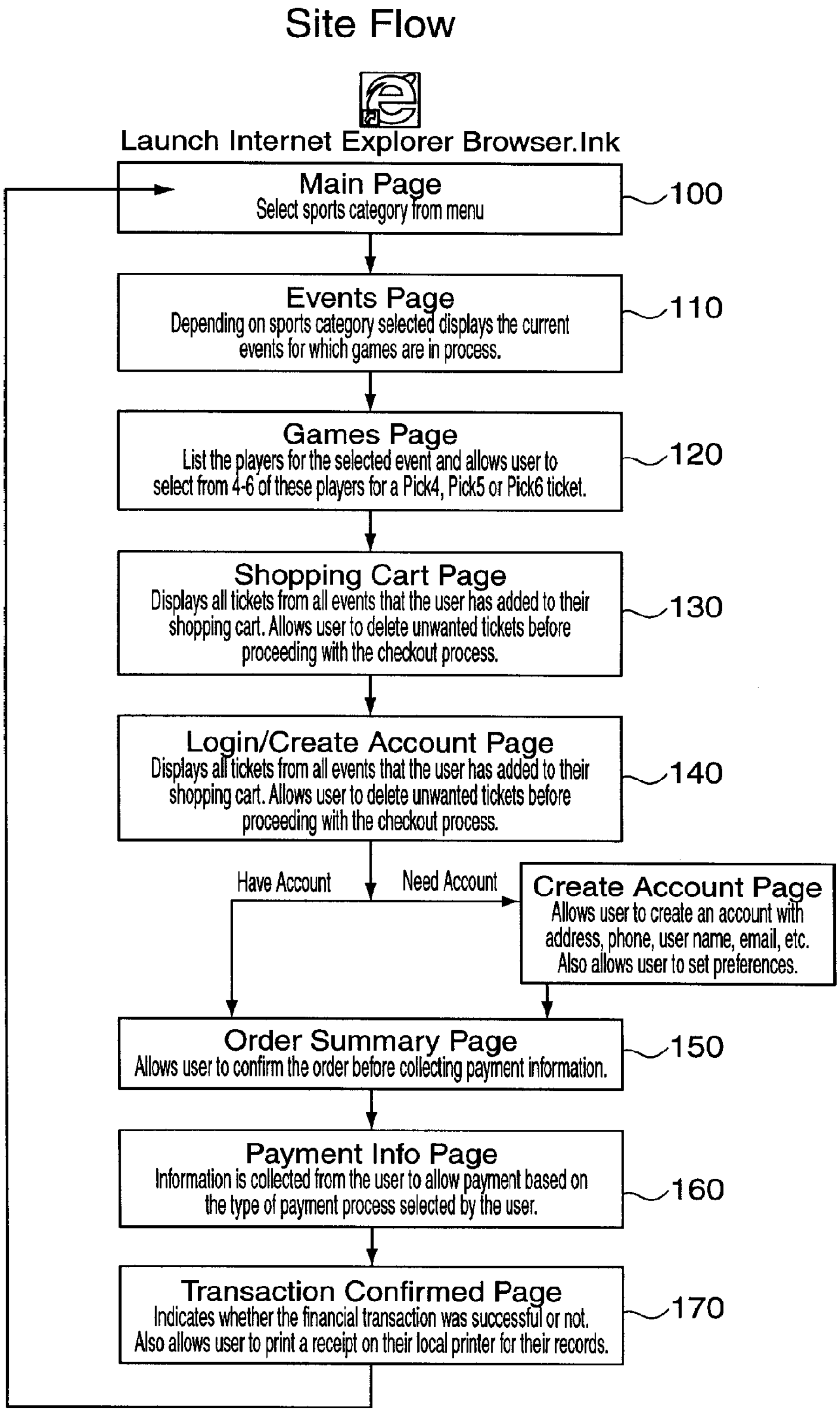
FIG. 2C depicts a flowchart diagram of a further preferred embodiment of the present invention.
Figure 2D:
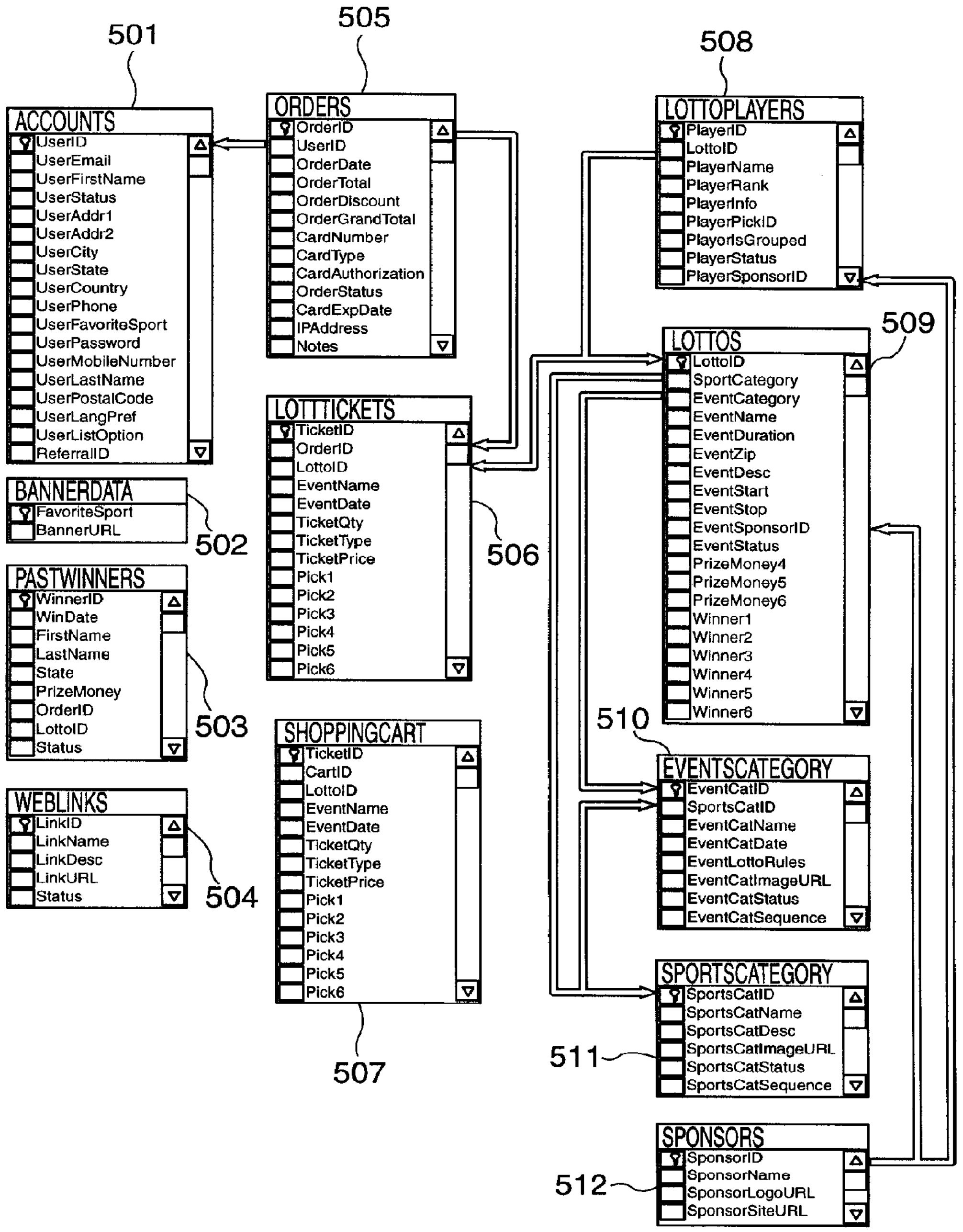
FIG. 2D depicts a preferred embodiment of a database scheme of the present invention.

Now referring to FIG. 2C, a further preferred embodiment of the invention comprises a WAN accessible web site comprising a main page 100, events page 110, game page 120, shopping cart page 130, log in/create account page 140, summary page 150, payment information page 160 and confirmation page 170. FIG. 2D comprises an example of a database scheme for this embodiment.

Figure 2E:
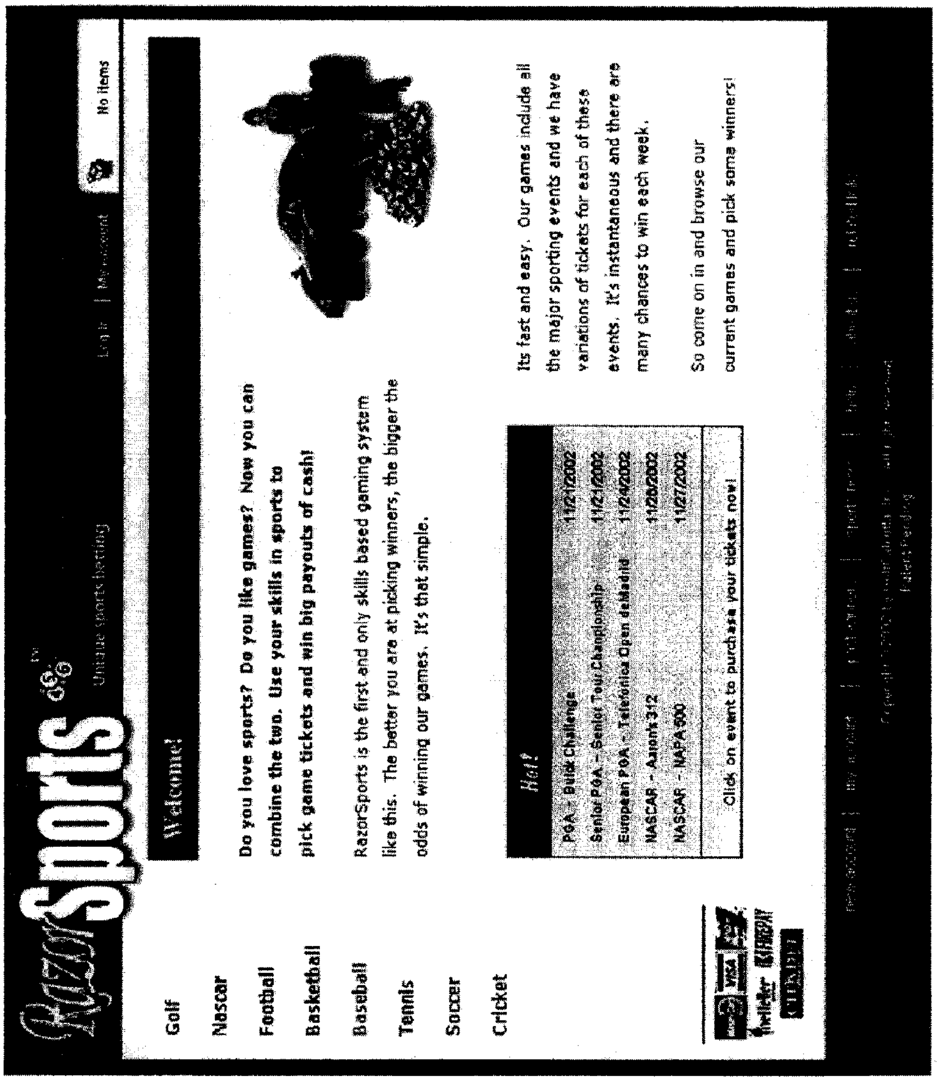
FIG. 2E depicts a preferred embodiment of a main page employed in accordance with the present invention.

Now referring to FIG. 2E, main page 100 comprises a plurality of sport categories from which a user may choose by for example clicking on a sport of interest. Main page 100, like all pages in this embodiment, may further comprise links to other pages such as, but not limited to, log in/create account page 140 or "hot links" to game page 120. Upon selecting a sport on main page 100, a user accesses events page 110.

Figure 2F:
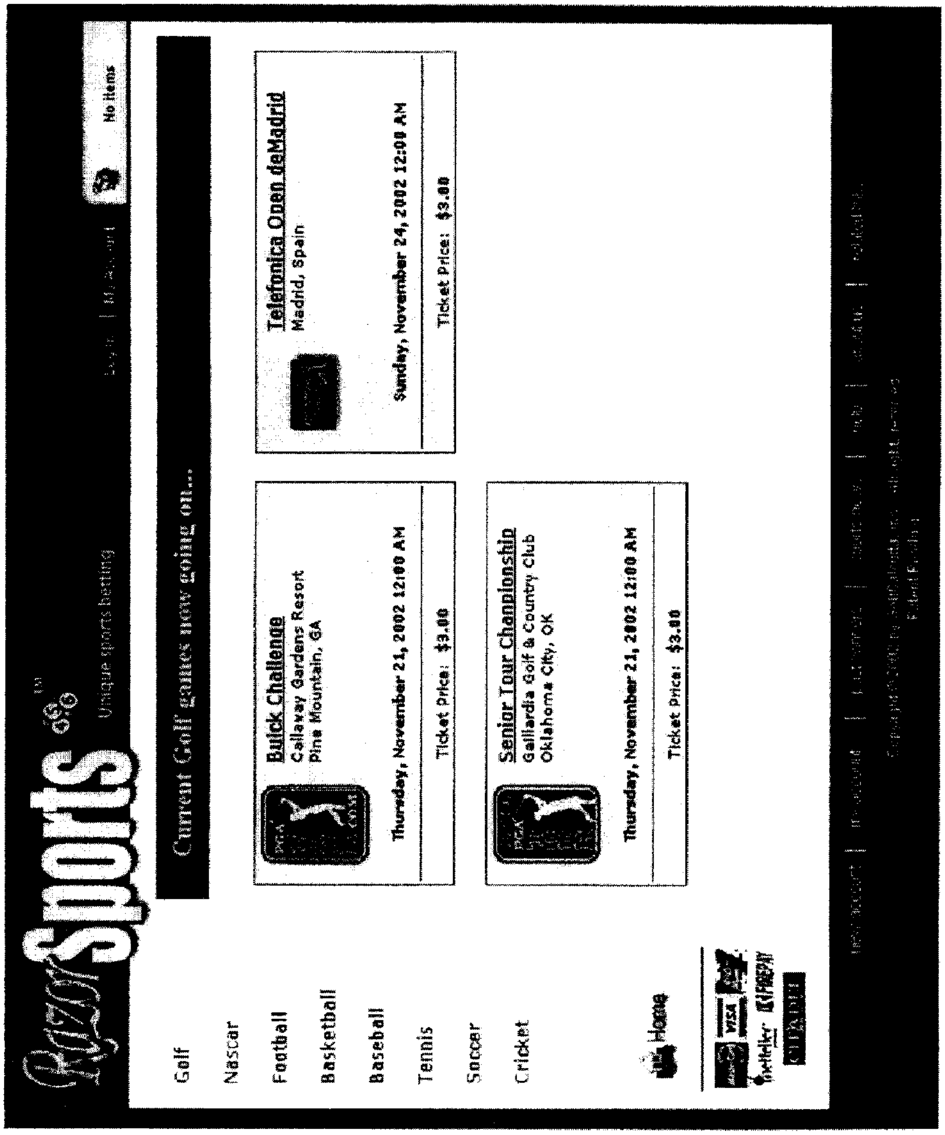
FIG. 2F depicts a preferred embodiment of an event page employed in accordance with the present invention.

Now referring to FIG. 2F, events page 110 displays the particular current events in the sport selected in main page 100 upon which a wager can be placed. Event page 110 preferably comprises links to other pages. A user selects an event from the event page 110 by clicking on the event and is transferred to game page 120.

Figure 2G:
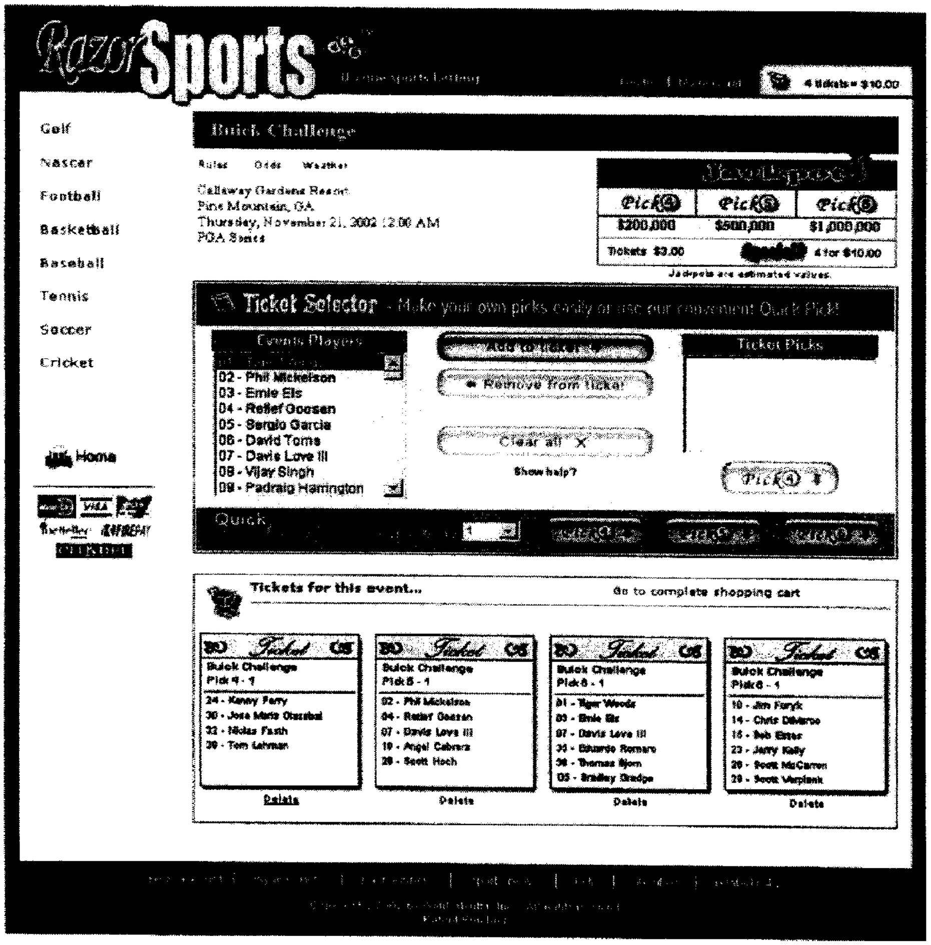
FIG. 2G depicts a preferred embodiment of a game page employed in accordance with the present invention.

Now referring to FIG. 2G, game page 120 comprises a list of the participants for the selected event and the rules and criteria governing the particular lottery to be conducted for that event. For example, in a preferred embodiment, game page 120 provides a list of players in a golf tournament and permits a user to select from four to six golfers or groups of golfers the user believes will finish in the top four, five or six places in the tournament. A user may use game page 120 to play multiple games. Game page 120 may provide the user, lists comprising the selections made for each game played.

Figure 2H:
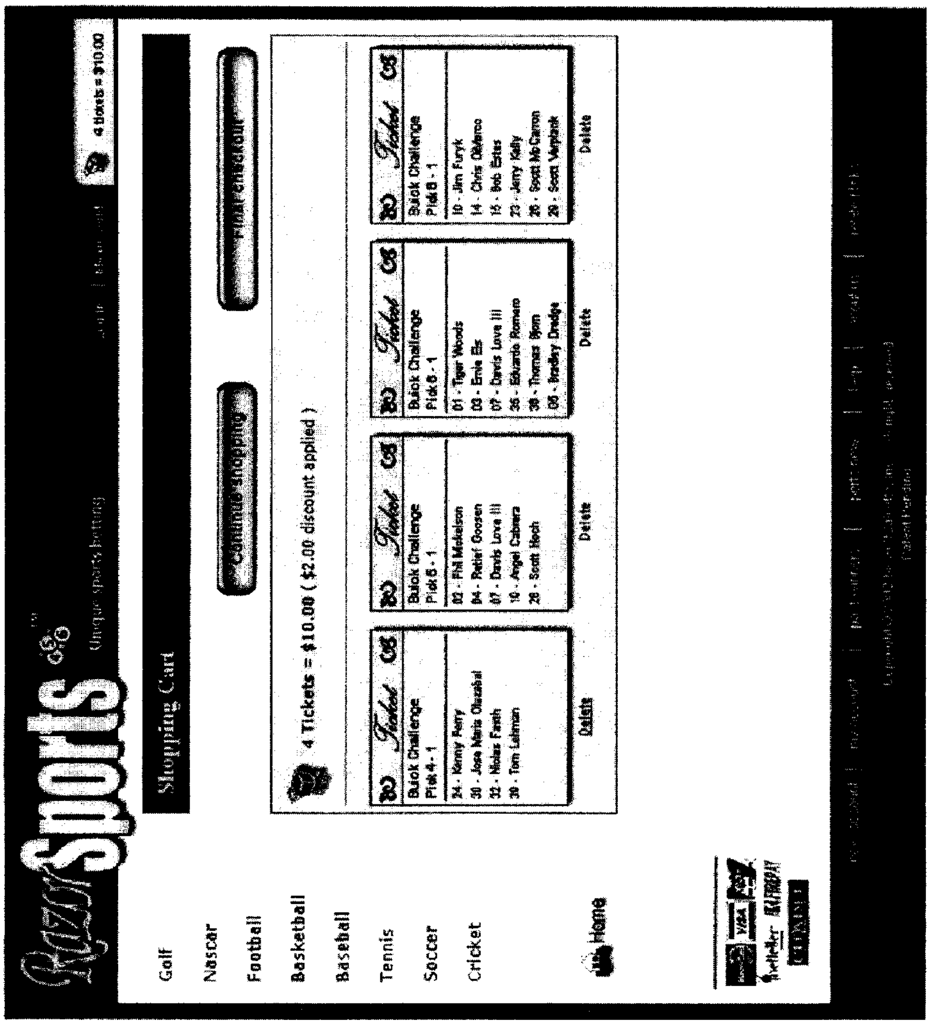
FIG. 2H depicts a preferred embodiment of a shopping cart page employed in accordance with the present invention.

Now referring to FIG. 2H, upon completing all selections, a user may click on a link to shopping cart page 130, which displays selections for each game in the form of lists or "tickets". Shopping cart page 130 permits a user to delete unwanted "tickets" or go back to the game page to add further "tickets". Once a user has decided to proceed with the "tickets" the user has created through his selections, the user may click on a link to the log in/create account page 140.

Now referring to FIG. 3A, if the user has an existing account the user enters his e-mail and password in dialog box 70 and proceeds to order summary page 150. Now referring to FIGS. 3B and 3C, if the user does not have an existing account the user creates an account using the prompts on create account page 140. Once an account and log in password are generated the user may proceed to order summary page 150. Order summary page 150 permits a user to confirm the order prior to proceeding to payment information page 160. Payment information page 160 collects payment information such as but not limited to credit card information. After entering said information the user submits the payment information for determination as to whether the information is valid and the financial transaction can be completed. Upon confirmation of a successful transaction the user is transferred to printable confirmation page 170.

Funds may be linked to be transferred between existing betting pools and the lottery of the present invention. Wagering fees are typically transferred after selections are made, but before the user is issued a wager confirmation. Winnings are typically credited at the conclusion of the sporting event via the Internet, or other transmission means, to existing bank, credit or betting accounts.

In many sporting events, for example a major golf tournament, there are a large number of players who compete, possibly 100 or more. This presents a group that is typically too large for purposes of a lottery. Thus, it is recognized that if a plurality of lower ranked players were to be grouped for betting purposes, the number of available selections from which to choose can be reduced to a manageable number appropriate for a lottery. This rank-group size inverse concept is exemplified in the flowchart of FIG. 4 and described below.

Referring to FIG. 4, in a preferred embodiment the total number of players in a sporting event is determined in step 401, and the total number of possible selections, that is often, but not always, less than the number of players, is determined in step 402. That is, if there are 100 players, but the wagering is known to be more attractive with a maximum of 50 selections, a number of players are grouped together, increasing the chance that a winner could emerge from a lower ranked player group. If the number of players is not greater than the number of selections, as determined in step 403, a simple list of players is generated according to rank in step 404. If the number of players is greater than the number of selections, the system or administrator establishes a maximum number of players to be listed individually in step 405, for example by reference to a pre-established chart, rule or the like. The number of individual players is subtracted from the total number of selections in step 406 to define a number of players to be grouped. The players that are to be listed individually are assigned positions on the list according to their rank in step 407, and the process of assigning groups is begun in step 408. In step 409, a determination is made as to whether the groups are to be equal or unequal in size, also by reference to a pre-established chart or rule. If the groups are to be equal, the system simply divides the number of grouped players into equal groups and generates the list in step 410. If the groups are to be unequal, the invention recognizes that division to place the lower ranked players into larger groups and the higher ranked players into smaller groups will encourage group wagering. Indeed, a user may select a first wager of 4 or 5 or 6 individual players and a second wager of 4, 5, 6 groups, increasing the interest aspect of the wager. Alternatively, a user may select individuals or groups.

If the groups are to be unequal, as determined in step 411, the number of grouped players "G" is divided by a preestablished factor "X," rounding odd numbers upwardly. Factor "X" is designed to determine the size of the first, smallest, group, and is reflective of the total number of grouped players. The result of the "G/X" division is assigned the first group number in step 412. "G/X," the size of the first group, is then multiplied by a factor, e.g., 1.5, to determine the size of the second group in step 413. The resultant group of players from the 1.5×"G/X" is assigned to the second group in the listing in step 414, and the process continues until all players are assigned in step 415. In this way, the second group has 50% more players than the first group and the third group has 50% more players than the second group, increasing the likelihood that one of the low ranked players in the groups may place high in the tournament. By way of example, and not limitation, if there are 50 grouped players, "X" is set at 8, making the first group=6, the second group=9, the third group=13, and the fourth group=20 (the 2 remaining players may be included in the fourth group—if the number of remaining players is greater than half the number assigned to the fourth group, the remaining players may be divided between the third and fourth groups, equally or proportionally). The factor 1.5 may be adjusted depending on the administrator's preference.

In a further example, the administrator may wish to conduct a game based on an event having 130 participants, such as a golf tournament, but desires the event to have 49 available selections, such that in order to win a user must correctly pick the four, five or six top finishers in any order. The administrator may specify the top 40 ranked participants are numbered 1 through 40. The remaining 90 participants are divided into 9 groups of 10 participants. Thus, the game will have 40 players individually listed with the corresponding identifying numbers 1-40 associated with their name and 90 players grouped in 9 groups with the identifying designations G1-G9 associated with each of the 9 groups of 10, resulting in 49 selections from which a player may select.

As indicated above, some preferred embodiments utilize a wide area network, such as, the Internet, for transmission and receipt of information for the gaming data. In these preferred embodiments the gaming server transmits information to the player in the form of a web site. The user accesses an initial, or home, page upon entry into the lottery system. The home page is an introductory page that comprises textual information and hyperlinks for access to subsequent screens in the lottery system. In some preferred embodiments, the home page is designed to direct a player to a foreign language home page and following pages, if desired, in which the information is presented in a specific language selected by the player.

The textual information comprises any type of information that the gaming provider chooses. In one embodiment, the textual information comprises gaming information and rules and regulations, or, in alternate embodiments, a link that connects the user to access a rules and regulatory information page. Gaming information comprises jackpot totals (i.e., an amount representing current wagers for an event that is soon to be played), upcoming lottery participatory sporting events and previous winning combinations. In some preferred embodiments, winning numbers and/or characters are updated immediately after the new winning combinations are determined.

In another preferred embodiment, the jackpot total is displayed in the different currencies of all of the countries in which the lottery game is available to be played. As more players participate in placing wager selections, the jackpot becomes larger. As the jackpot becomes larger, the displayed totals change to reflect the most recent information each preset time interval, such as, for example, every minute, quarter hour, or every hour.

The rules and other regulatory information can be included directly on the home page, or, in alternate embodiments, is able to be accessed via a hyperlink from the home page. Players may also access the rules and regulations from other pages (described below) on the site, or from a number of different pages. If the rules and regulation information is accessed via a hyperlink, the user is directed to a file comprising "How to Play" information stored in a memory device from which it can be retrieved. Preferably, the rules and regulations information comprise information related to restrictions of the game, including, but not limited to, information regarding who is not eligible to play the game; entry provisions; how to claim the jackpot; claiming deadlines; dispute resolution; miscellaneous transaction fees; and definition of legal terms. As regulations and rules change, due, for example, to changes in laws, or at the discretion of the lottery provider, this section is updated to reflect such changes.

The home page includes at least one hyperlink, for example, a "Play" button, such that the player can exit the home page and advance to other pages on the system, wherein the user can ultimately indicate his or her selections to play. In one preferred embodiment, the home page comprises hyperlinks to registration or sign-up pages, which are written in English and a number of foreign languages, or as previously discussed, as well as hyperlinks to the rules and regulations file.

If a user chooses to participate in the game, the user may be required to register prior to commencing play of the game. Selection of the aforementioned command hyperlink will send the user to a registration page. If a user has previously registered, the registered user can simply access selection pages by entry of a password.

Once information has been entered into the registration page, the player enters a command, such as a HTML hyperlink embedded in a "play" button graphic which moves the user to the next step of the process. In some preferred embodiments, a user cannot progress to the next step of the process until all of the information is provided and the underlying transaction has been authorized and cleared. In some preferred embodiments, if any part of the registration page form is not filled in completely, or if the form of payment is rejected, the player is sent back to the registration page to correct the problem.

In some preferred embodiments, once the requested information on the registration page has been provided and transmitted, and the underlying transaction has been approved and accepted, the user can access the game page via the gaming server. In preferred embodiments, the user clicks on a "play" button which accesses the game page if the above requirements have been met. Alternatively, a player may browse the game page and is not required to register until he is satisfied he wishes to play. In such a case, the user may make all selections and not be required to register until he decides to participate.

Different payouts for correct choices are contemplated. The highest payout is made to a user selecting six out of six correct top finishers. Correctly choosing five of five or four of four also results in payouts. In a most preferred embodiment, a bonus payment may be made for picking the top six or five or four finishes in the correct order of finishing. A further variation is to pick the top finisher in the top spot and the other top finishers in random order.

In a preferred embodiment, if there is no winner for a particular lottery the jackpot is rolled over into another lottery game, preferably based on a similar sporting event. For example, if there is no winner of the lottery based on the outcome of the British Open, the jackpot is rolled into the next scheduled PGA event.

Having described preferred embodiments of a system and a method for facilitating on-line lottery games according to the present invention, it is noted that modifications and variations can be made by persons skilled in the art in light of the above teachings. For example, notwithstanding the fact that the present invention is a skill based lottery system, it is contemplated that the game be offered to users with the option of making "quick pick" selections via a random number generator.

It is also contemplated that the game may be offered such that users may enter their picks on paper or verbally communicated to an administrator and the users selections are used to generate a "ticket", either in electronic, paper or other suitable form. The ticket may be a confirmation containing the users' selections and the player may determine if the ticket is a winner by submitting it to an administrator for determination and subsequent payment.

Accordingly, it is not intended that the scope of the claims appended hereto is limited to the description as set forth herein, but the claims should be construed as encompassing all features that would be treated as equivalent to those of the present invention by those skilled in the art.

What is claimed is:

1. A method for conducting a game, the method comprising:

storing information in memory regarding a plurality of competition-based events, wherein each competition-based event is associated with a time window, a payout structure, and a plurality of elements;

assigning each competitor of a plurality of competitors in a selected competition-based event a number, wherein the assigned number corresponds to an individual ranking designated by an administrator;

dividing the plurality of competitors into a plurality of groups, wherein a composition of each group is designated by the administrator;

receiving a plurality of game entries for the selected competition-based event, wherein each game entry is associated with a wager and a group and includes a guess for each of the plurality of elements associated with the selected competition-based event and for an order for the competitors in the group associated with the game entry, the game entries sent over a communication network;

receiving information regarding an outcome of the selected competition-based event, the outcome including information regarding each of the plurality of elements;

executing instructions stored in memory, wherein execution of the instructions by a processor:

identifies one or more winning entries for each of the plurality of groups, wherein identification includes:

filtering out the game entries that were received for the selected competition-based event outside of the associated time window, identifying one or more of the remaining game entries that included the most matches between the guess for each element, the order, and the outcome of each element and order, identifying one or more winning entries according to the payout structure, and calculates a payout for each of the one or more winning entries for each group, each payout calculated based on a total of wagers received in the group and the wager associated with the winning entry; and sending a notification to a user associated with each of the one or more winning entries, the notification including the associated calculated payout.

2. The method of claim 1, wherein the selected competition-based event includes a series of sports games.

3. The method of claim 1, wherein the elements include at least one top finisher in the competition-based event.

4. The method of claim 1, wherein the selected competition-based event is further associated with a predetermined cap and wherein dividing the plurality of competitors into the groups is triggered when a number of entries received for the selected competition-based event exceeds the cap.

5. The method of claim 4, wherein the composition of the groups is further based on competitor performance.

6. The method of claim 4, wherein the predetermined cap is based on a number of all possible combinations of outcomes.

7. The method of claim 4, further comprising ranking each competitor associated with the entries received for the selected competition-based event, wherein the composition of the group is further based on the ranking of the associated competitor.

8. A non-transitory computer-readable storage medium, having embodied thereon a program executable by a processor to perform a method for conducting a game, the method comprising:

storing information in memory regarding a plurality of competition-based events, wherein each competition-based event is associated with a time window, a payout structure, and a plurality of elements;

assigning each competitor of a plurality of competitors in a selected competition-based event a number, wherein the assigned number corresponds to an individual ranking designated by an administrator;

dividing the plurality of competitors into a plurality of groups, wherein a composition of each group is designated by the administrator;

receiving a plurality of game entries for the selected competition-based event, wherein each game entry is associated with a wager and a group and includes a guess for each of the plurality of elements associated with the selected competition-based event and for an order for the competitors in the group associated with the game entry, the game entries sent over a communication network;

receiving information regarding an outcome of the selected competition-based event, the outcome including information regarding each of the plurality of elements;

identifying one or more winning entries for each of the plurality of groups, wherein identification includes:

filtering out the game entries that were received for the selected competition-based event outside of the associated time window, identifying one or more of the remaining game entries that included the most matches between the guess for each element, the order, and the outcome of each element and order, identifying one or more winning entries according to the payout structure, and calculating a payout for each of the one or more winning entries for each group, each payout calculated based on a total of wagers received in the group and the wager associated with the winning entry; and sending a notification to a user associated with each of the one or more winning entries, the notification including the associated calculated payout.

* * * * *